United States Patent
Miner et al.

(10) Patent No.: US 8,025,795 B2
(45) Date of Patent: Sep. 27, 2011

(54) BALLAST WATER TREATMENT SYSTEM

(75) Inventors: Jeffrey G. Miner, Bowling Green, OH (US); Richard E. Fredricks, Severna Park, MD (US); Christopher P. Constantine, Tenafly, NJ (US); Gerard J. Lynch, Bridgewater, NJ (US)

(73) Assignee: Maritime Solutions, Inc., New York, NY (US)

( * ) Notice: Subject to any disclaimer, the term of this patent is extended or adjusted under 35 U.S.C. 154(b) by 894 days.

(21) Appl. No.: 11/673,147

(22) Filed: Feb. 9, 2007

(65) Prior Publication Data
US 2008/0190826 A1    Aug. 14, 2008

(51) Int. Cl.
*B63J 4/00* (2006.01)
(52) U.S. Cl. ............... 210/97; 210/170.05; 210/170.11; 210/295; 210/411
(58) Field of Classification Search .................... 210/97, 210/170.05, 170.11, 295, 411
See application file for complete search history.

(56) References Cited

U.S. PATENT DOCUMENTS

| | | | | |
|---|---|---|---|---|
| 4,336,223 A * | 6/1982 | Hillman | ........................ | 422/24 |
| 6,500,345 B2 * | 12/2002 | Constantine et al. | ......... | 210/747 |
| 6,599,422 B2 * | 7/2003 | Constantine et al. | ...... | 210/512.3 |
| 6,669,838 B1 * | 12/2003 | Baarman | ........................ | 210/85 |
| 7,128,009 B2 * | 10/2006 | Randall | ........................ | 114/125 |
| 7,166,230 B2 * | 1/2007 | Nilsen et al. | .................. | 210/739 |
| 7,198,713 B2 * | 4/2007 | Hamann et al. | ............... | 210/108 |
| 2004/0159599 A1 * | 8/2004 | Hamann et al. | ............... | 210/202 |

FOREIGN PATENT DOCUMENTS

WO    WO 2005061388 A1 *    7/2005

* cited by examiner

*Primary Examiner* — Terry Cecil
(74) *Attorney, Agent, or Firm* — Notaro, Michalos & Zaccaria P.C.

(57) ABSTRACT

A ballast water treatment system for treating ballast water for a vessel has a pathway for navigable raw water to the tank and a discharge for discharging water back to the body of navigable raw water. A back washable filter in the pathway receives the raw water and screens sediment from the raw water to produce initially processed water which contains at least some marine organisms. A UV or other biocidal device is connected between the filter and the ballast tank, for disabling or killing the marine organisms in the initially processed water to produce treated ballast water for the main outlet to the ballast tank.

17 Claims, 2 Drawing Sheets

BALLAST WATER TREATMENT SYSTEM

FIELD AND BACKGROUND OF THE INVENTION

The present invention relates, in general, to water purification methods and apparatus, and, in particular, to a new and useful apparatus and method for treating ballast water before it is pumped into the ballast of a ship, barge or other vessel in order to reduce or eliminate the danger of contaminating remote bodies of water with non-indigenous life forms when the ballast water is later discharged into that remote body of water.

Ballast Water Issue

The introduction of invasive marine species into new environments by ship's ballast water has been identified as one of the greatest threats to the world's ocean, coastal and inland waters. To reduce the probability that ballast water contains significant numbers of non-indigenous species, the International Maritime Organization or IMO established a set of voluntary guidelines for the control and management of ships' ballast water to minimize the transfer of harmful aquatic organisms and pathogens. The IMO Assembly first adopted these guidelines in 1997. They replaced earlier, less comprehensive voluntary guidelines adopted in 1993. Management and control measures recommended by the guidelines include: minimizing the uptake of organisms during ballasting, cleaning ballast tanks and removing mud and sediments, avoiding unnecessary discharge of ballast, and undertaking certain ballast water management practices. The management practices include: exchanging ballast water at sea, the non-release or minimal release of ballast water, and discharge to onshore reception and treatment facilities.

An international Convention for the Control and Management of Ships' Ballast Water and Sediments has been adopted by the IMO and announced on Feb. 13, 2004. The Convention will enter into force 12 months after ratification by 30 States.

Beyond the significant efforts being expended by IMO member countries to develop an international legal instrument, many countries and even sub-national jurisdictions have unilaterally developed or are developing national or local legislation. These include Australia, Canada, Chile, Israel, New Zealand, the USA, and various individual states within the USA including all those bordering the Great Lakes, as well as California, Oregon, Washington, Alaska and Hawaii, and various individual ports around the world, such as Buenos Aires in Argentina, Scapa Flow in Scotland, and Vancouver in Canada.

Discharge Criterion and Regulations

The criterion for wastewater treatment and discharge as it applies to vessels is administered on an international, national, state, and even the local levels, with some variation based on route, tonnage, type of vessel, and length of vessel. With respect to ballast water discharges, IMO has established a ballast water exchange standard and a ballast water performance standard. Ballast water exchange (i.e. the replacement of the ballast water while the vessel is at sea in order to reduce the concentration of contaminants) can still be used, for a limited period of time, to meet the performance standard:

Regulation D-1 Ballast Water Exchange Standard—Ships performing ballast water exchange should do so with an efficiency of 95 percent volumetric exchange of ballast water. For ships exchanging ballast water by the pumping-through method, pumping through three times the volume of each ballast water tank shall be considered to meet the standard described. Pumping through less than three times the volume may be accepted provided the ship can demonstrate that at least 95 percent volumetric exchange is met.

Regulation D-2 Ballast Water Performance Standard—Ships conducting ballast water treatment shall discharge less than 10 viable organisms per cubic meter greater than or equal to 50 micrometers in minimum dimension and less than 10 viable organisms per milliliter less than 50 micrometers in minimum dimension and greater than or equal to 10 micrometers in minimum dimension and discharge of the indicator microbes shall not exceed the specified concentrations.

The indicator microbes, as a human health standard, include, but are not limited to: a. Toxicogenic *Vibro cholerae* (O1 and O139) with less than 1 colony forming unit (cfu) per 100 millimeters or less than 1 cfu per 1 gram (wet weight) zooplankton samples; b. *Escherichia coli* less than 250 cfu per 100 millimeters; and c. Intestinal enterococci less than 100 cfu per 100 millimeters.

Prior System

U.S. Pat. No. 6,500,345 for an APPARATUS AND METHOD FOR TREATING WATER issued Dec. 31, 2002 is incorporated here by reference and includes a solids separator that is also disclosed in U.S. Pat. No. 6,599,422 issued Jul. 29, 2003 for a SEPARATOR FOR LIQUIDS CONTAINING IMPURITIES which is also incorporated here by reference.

The system disclosed by these patents that are also owned by the assignee of the present application, comprise a centrifugal particulate separator and an UV irradiation system manufactured.

SUMMARY OF THE INVENTION

After careful consideration and research, a proprietary filter technology developed by Ballast Safe Filtration Company (BSFc) and manufactured by Odis, both of Israel was identified for inclusion in the ballast water treatment system of the present invention.

The present inventors also recognized that even with the best filter and UV components, the system would likely still not be capable of achieving the required level of treatment under all environmental conditions, unless the system was dynamic and thus capable of responding to these extreme environmental conditions. Therefore, concurrent with the search for the most appropriate filtration technology and improvements to the UV system, the inventors established a relationship with ABB Instrumentation, a subsidiary of ABB Ltd. of Zurich, Switzerland. As a result of this relationship, ABB Instrumentation has developed a proprietary water quality monitoring and flow control system designed to assure and document effective treatment by continuously monitoring a number of water quality parameters, automatically adjusting system flow rate, and recording all required water quality and system operation parameters. Additionally, the ABB monitor has been integrated with the electronics of the BSFc filter and the Berson UV unit into the complete operating system of the present invention.

Accordingly, an object of the present invention to provide a ballast water treatment system for treating water for a vessel ballast tank, which comprises pathway means defining a water pathway having a main inlet for connection to a body of navigable raw water for the vessel, the raw water containing sediment and marine organisms, the pathway also having a main outlet for connection to the ballast tank and a discharge for discharging water to the body of navigable raw water, the pathway including ballast water piping for supplying raw water from the main inlet to the main outlet for the ballast tank; a back washable filter in the pathway, the filter having a filter inlet for receiving the raw water from the main inlet, the filter screening sediment from the raw water to produce initially processed water which contains at least some marine organisms, the filter having a first outlet for supplying initially processed water to the pathway, a second outlet for supplying back washing water to the discharge, and a third outlet for supplying pre-screened water from the filter to the discharge; biocidal means connected between the first outlet of the filter and the main outlet to the ballast tank, for receiving initially processed water from the filter and for disabling or killing the marine organisms in the initially processed water to produce treated ballast water for the main outlet to the ballast tank; and a ballast pump connected to the pathway, in line with the filter and biocidal means and in line with the ballast water piping for pumping water along the pathway between the main inlet and the main outlet, and through the filter and the biocidal means.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
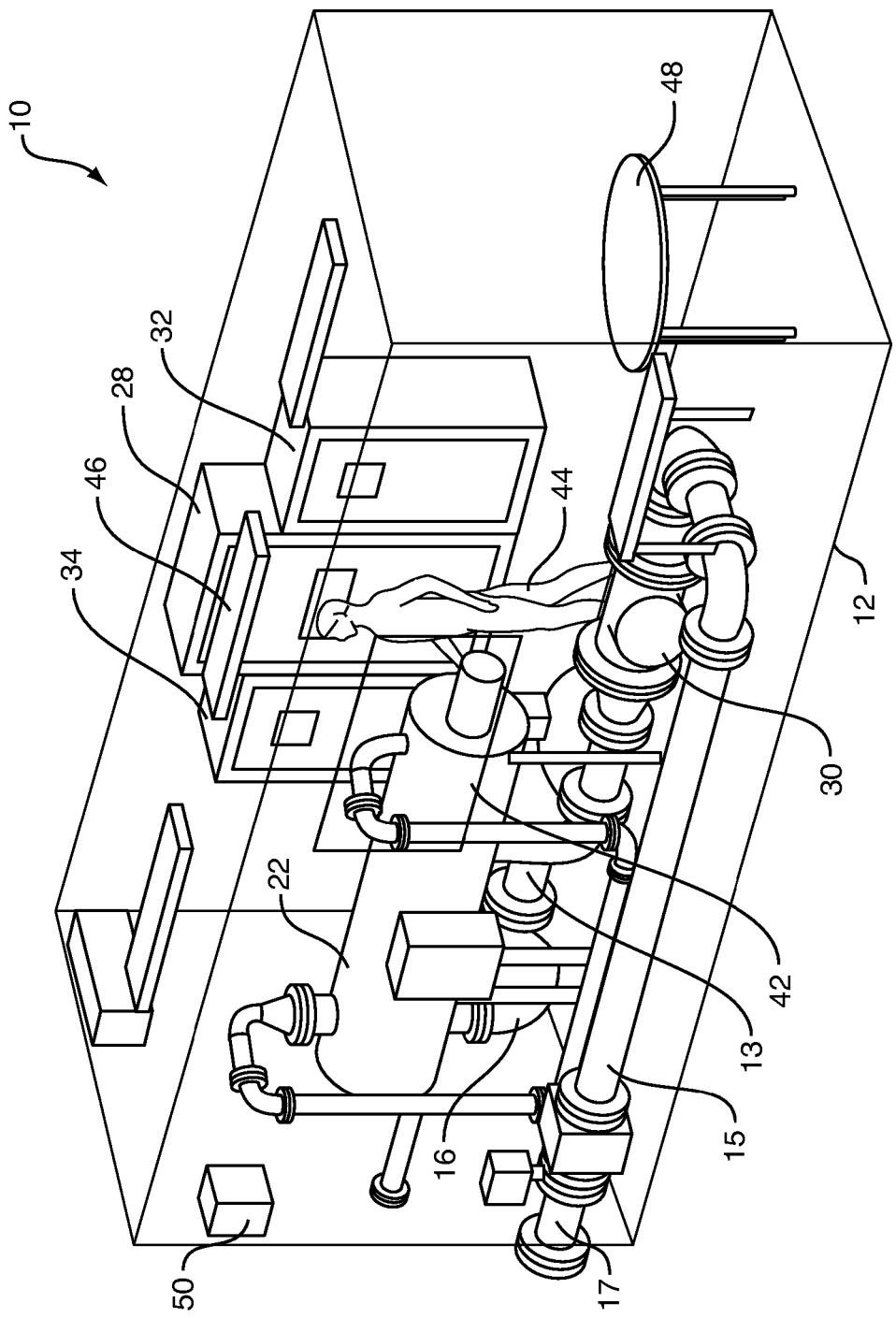
FIG. 1 is a perspective view of the ballast water treatment system of the present invention, assembled in a standard container for convenient transport and connection to the ballast system of a vessel.

Referring to the drawings, in which like reference numerals are used to refer to the same or similar elements, FIG. 1 illustrates the ballast water treatment system of the present invention generally designated 10, which has been assembled in a standard container 12, for example of 8'×8'×20' rectangular and self supporting metal construction. Although an embodiment of the invention is illustrated in container 12, the components of invention will usually be installed in the appropriate spaces of the vessel without requiring a container and without limiting the invention to the particular arrangement of parts shown in FIG. 1.

Figure 2:
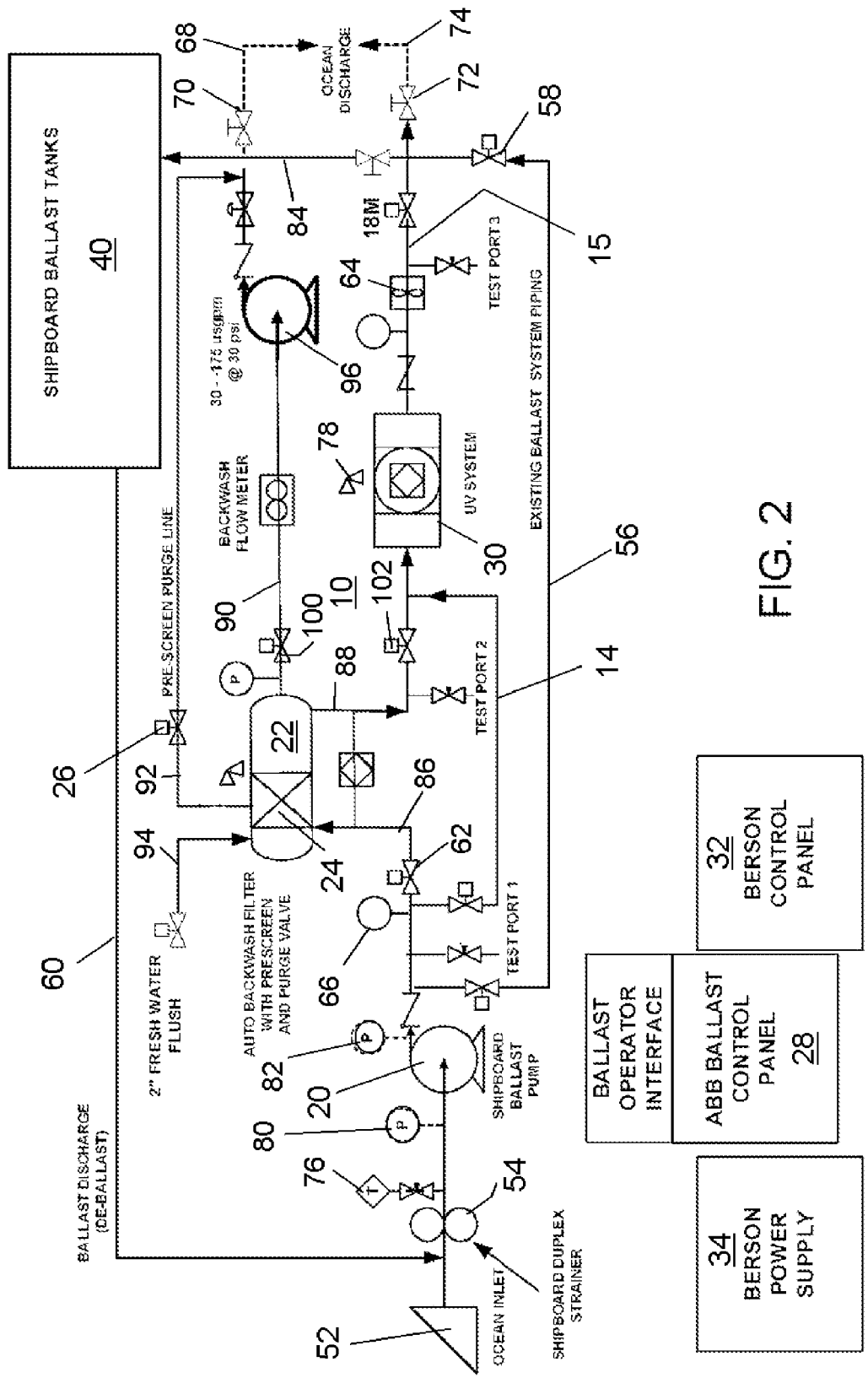
FIG. 2 is a schematic diagram of the system.

System 10 includes an 8" diameter main inlet pipe 13 with a flange 16 for connection to the preexisting ballast water pump 20 shown in FIG. 2, of the ship or other vessel to be serviced by the system. After processing in the manner of the present invention, the treated ballast water is sent in an 8" diameter main outlet pipe 15 to the ballast tank 40 of the vessel. The main outlet pipe 15 is connected to the preexisting ballast inlet pipe by a flange 17, so that the system of the invention can be provided in a modulate fashion and operates in parallel to the preexisting ballast system without disturbing that system. Although a system based on an 8" diameter inlet pipe is shown, it is understood that different diameter pipes can be used to provide systems of different capacities for vessels of different sizes.

The main components of the system 10, as shown in FIG. 2, include an automatic backwash filter 22 with pre-screen 24 and purge valve 26, a UV biological agent killing unit 30, and a control and monitoring arrangement connected throughout the system and to be explained in greater detail later in this disclosure. A system control panel 28 is mounted on an interior wall of the container 12 as are a UV unit control panel 32 and UV unit power supply 34.

As best shown in FIG. 1, the container 12 also includes one or more windows 42 so that the operator 44 inside the container can see what is going on outside the enclosed environment of the treatment system 10 and maintain visual contact with the outside, and space is available for furnishings 48 such as a table, chairs and work shelves and surfaces for storing, consulting and working on system manuals, reports and the like. Internal overhead and other lighting 46 is also provided, as is a main power panel 50 for connecting and disconnecting main power to the system.

Returning to FIG. 2, the preexisting ballast system includes the ballast tank 40, its ocean water inlet 52 (which may inlet water from any body of water in which the vessel is sailing, not only the ocean), a shipboard duplex strainer 54, the shipboard ballast water pump 20, and the shipboard ballast system piping including a main supply pipe 56 (e.g. an 8" pipe), 8" isolation valve 58 and ballast discharge or de-ballast pipe 60.

As noted above, the system 10 of the present invention is modular and is connected in parallel to the existing shipboard ballast system so that it can be easily connected to the vessel without disrupting existing functions, it can allow unhindered operation of the ballast system when treatment is not necessary and, importantly, it can be disconnected for updating, exchange with a different modulate ballast water treatment system, or for maintenance, with little interruption of shipboard operation and no adverse effect on preexisting ballast functions.

An initial basis for the invention was in the realization that a continuous water quality monitoring and flow control capability was needed, leading to use of ABB's equipment and know-how.

General attributes of the ballast water treatment system of the invention which make it an effective alternative to ballast water exchange are listed as follows.

The system comprises components that have long been proven in other contexts (e.g. water sanitation and filtration), it is completely scalable and can, as a result, match ballast water flow rates equal to the loading rates required by more than 94 percent of the world's merchant vessels, and all of the world's combatant vessels and yachts.

The compact size and energy efficiency of the complete system allows for easy, cost effective, installation and operation aboard existing vessels and new building tonnage.

The system's secondary UV treatment stage 30 is effective and safe for both the crew and the environment. Residence time associated with effective treatment is significantly reduced due to continuous water quality monitoring as well as first stage removal of entrained solids in the filter 22, and does not, as a result, hinder the ballasting process.

Environmental benefits accrue from the ship's ability to utilize the system during every ballasting without any impact or slowdown on other vessel activities or operations.

Additional system attributes include two stage automatic ballast water treatment, a self contained monitoring control system, automatic fluid flow adjustment based on influent water TSS and UV transmission rate quality, a self-monitoring control system providing maximum invasive species kill rate, automatic data logging with remote data access system, incorporation of an automatic corrosion inhibiting fresh water flush system with provision for biocide injection to preclude fouling between ballasting operations, self-cleaning fine filtration including self-flushing strainer and automatic filter backwash assist pump, a local operator control console, an upset condition bypass to ensure operational flexibility, fail safe control valves, and the capable of achieving a desired dose rate.

The system of the invention is adaptable to changing environment, such that the system can detect changes in environmental conditions (TSS and UV transmission rates) and adjust flow rate to achieve desired level of treatment, and it is assembled with standard components to handle any needed ballast flow rate.

Attributes of the ABB monitoring and flow control system include:

Electromagnetic Flowmeter—Suitable for all applications found in the water industry from potable to waste water treatment. With a wide flow range and high accuracy, ABB flowmeters improve control and quality of water distribution and treatment works.

pH and Conductivity Analyzers—High specification, high performance analyzers for the measurement of pH and conductivity. Cost effective, reduced maintenance with continuous in-line pH diagnostics and auto-water wash/chemical clean, problem-free conductivity using auto-compensation of sensor fouling, and on-board PID controller.

Turbidity Monitoring System—Suitable for turbidity monitoring in raw water and effluent discharge applications. Eliminates the need for hazardous chemical standards and provides dry calibration for both span and zero, prevents fouling with automatic cleaning fitted to all units, and lower costs.

Temperature Transmitter—Transmitters provide interface from the temperature sensor to the PLC and offers excellent long-term stability with enhanced self-diagnostic capability. Range of mounting and displays available.

Pressure Transmitter—Transmitters offer one of the most complete ranges of measurement available. High accuracy, reduced downtime, remote seals and choice of materials.

Advanced Videographic Records—Delivers the latest in electronic data recording technology and convenience for water industry applications. Available in a range of models, flow totalization with automatic generation of detailed flow total logs.

Process Controllers—Controllers set the highest standards in industrial instrumentation. In-built 2 wire transmitter power supply, links to central PLC via MODBUS, front plate rated to NEMA 4X/IP 66 protection, and Windows™ based PC Configuration Software intervention.

Process Recorders—Recorders suitable for a wide range of applications.

Attributes of the Ballast Safe Filtration Company (BSFc) filter include: fine screen filter made from sintered, multi-layered stainless steel; the filter screen does not require support; especially designed to remove organic matter to meet IMO D-2 standard; significantly larger open screen area to facilitate filtering; exceedingly effective self-cleaning process automatically activated by DP pressure switch/gauge or timer; continuous cleaning of large volumes of dirt load during ballasting process without interruption; reversible screw system for smooth, reliable and rapid cleaning of the entire screen surface; optional coarse screen self-flushing strainer action ensuring a trouble-free operation for longer time periods; high screening efficiency; fully automatic self-cleaning system efficiently handles heavy dirt load in raw water; low operating pressures meet parameters of existing ballast water pumps; uninterrupted filtered water supply during flushing; long service life due to anti-corrosion protection coating and stainless steel screen; low maintenance cost; low cost per cubic meter of filtered water; and small footprint.

Attributes of the on-line UV unit sold by Berson UV-techniek of Nuenen, The Netherlands, under the "BERSON INLINE" trademark include: an established product offering a proven range of Berson InLine+UV treatment; UV treatment chambers fabricated from marine grade stainless steel (SS316L), according to AISI and to ISO 9000 standards, internal finish 0.8 micron, degrees of protection IP54, with automatic cleaning, access hatch, temperature device (PT100), UV sensor (UVector MPI), drain tap, air relief valve, liquid level (wet/dry) detection interface, electric ground fault isolation, pressure vessel certification (10 bar), and pressure test (15 bar for 30 minutes).

The Power/Control Electronic Cabinets are fabricated to degrees of protection (IP54, of painted steel coated to RAL 7032.

The electric system is 480 V–60 Hz (3Phase+Ground+Earth), with safety door switch, energy control, power on indication, lamp on indication, UV alarm indication, water high temperature alarm, cabinet high temperature alarm, operating hours counter, remote on/off, system ready indicator, UV lamp failure alarm, temperature alarm, and UV intensity indicator.

A 200 cubic meters per hour capacity prototype embodying the present has been assembled, containerized, tested and calibrated by ABB Instrumentations in Warminster, Pa.

Referring back to FIG. 2, the ballast water treatment system for treating water for a vessel ballast tank 40 of the present invention, comprises a water pathway having the main inlet 52 for connection to a body of navigable raw water for the vessel such as an ocean, a sea, a lake, a bay or a river, the raw water containing sediment and marine organisms, the pathway also having a main outlet 84 for connection to the ballast tank 40 and a discharge 68 and/or 74 for discharging water to the body of navigable raw water. The pathway includes the existing ballast water piping 56 for supplying raw water from the main inlet 52 to the main outlet 84 for the ballast tank so that the system of the invention can be entirely bypassed if necessary or desired.

The washable filter 22 is in the pathway and has a filter inlet 86 for receiving the raw water from the main inlet. The filter screens sediment from the raw water to produce initially processed water which contains at least some marine organisms, the filter having a first outlet 88 for supplying initially processed water to the pathway, a second outlet 90 for supplying back washing water to the discharge, and a third outlet 92 for supplying pre-screened water from the filter to the discharge. The filter 22 is a two chamber filter having a first self-cleaning screening stage and a second self-cleaning filter stage. Although the existing strainer 54 on the ship may collect material that would be screened by the screening stage of filter 22, the screening stage will collect any large particles or objects that may have gotten past the strainer 54, or, in cases where the strainer 54 has not been properly emptied of its usual collection of small fish, debris and other small items, or in some cases where the straining screen may even have been removed, the first strainer chamber of filter 22 will function to exclude these large items from the water stream. The second filter stage will then exclude particles down to the desired particle size before the water is allowed to progress to the UV system.

The UV system or other biocidal means 30 is connected between the first outlet 88 of the filter and the main outlet 84 to the ballast tank, for receiving initially processed water from the filter and for disabling or killing the marine organisms in the initially processed water to produce treated ballast water for the main outlet to the ballast tank 40. The existing ballast pump 20 is connected to the pathway, in line with the filter and biocidal means and in line with the ballast water piping for pumping water along the pathway between the main inlet and the main outlet, and through the filter and the biocidal means.

A fresh water flush inlet 94 is connected to the filter for supplying clean potable water from the vessels supply of potable water to the filter for cleaning the two stages of the filter. A back flush or buster pump 96 is provided for pumping the fresh water from the fresh water flush inlet through the filter to back flush the filter, or, when raw water from the body of water is used to back flush the filter, to boost the water flow. Pump 96 is also not always used if the fresh water inlet 94 has high enough water pressure to pass the filter stages without assistance, and the pump is not used when the fresh cleaning water from inlet 94 is passed to the UV system for cleaning that system, by closing a back flush valve 100 and opening the valve 102 between the filter 22 and the UV system 30. During other cycles of operation the buster pump 96 is used to help draw water through the filter 22 for cleaning. The booster pump is present to insure that there is sufficient pressure difference between the inlet and outlet sides of the filter regard less of the placement of the filter and the draft or trim of the ship.

The filter bypass pipe 14 bypasses the filter 22 and the ballast tank 40 has the tank outlet 60 for water from the tank. The tank outlet 60 is connected to an inlet of the ballast pump 20 and a valve set is connected to the bypass pipe 14 and the biocidal means 30 for passing water from the ballast tank 40, through the tank outlet 60 and the bypass pipe 14 and from the biocidal means 30 to the discharge 74 for disabling or killing marine organisms in the water from the ballast tank before the water is returned to the body of water.

Operation of the Ballast Water Treatment System or BWTS of the present invention includes Ballast and Deballast segments. The Ballast segment is thru the filter and ultraviolet or other biocidal system and the Deballast segment is thru the ultraviolet or other biocidal system only.

The treatment system of the invention for a cargo ship influent (ballast water inlet) and effluent (ballast water discharge) is shown in FIGS. 1 and 2.

Automatic Operation:

The Ballast Water Treatment System (BWTS) operates in the following manner. Automatic operation is based on triggers of the ABS Control Panel Start BWTS button which is a softkey on the process panel screen 28.

When the vessel is to take ballast, the ship engineer will push a Ballast Softkey pump start command button to start the ultraviolet system warm up and the ultraviolet system/filter check verification then the filter feedback is ready for ballast water. An influent control valve 62 then opens and the ballast pump or pumps 20 start pumping influent water which is passed thru a magnetic flowmeter 64 and through the filter 22 and ultraviolet or other biocidal system 30 of the BWTS.

A clean stream from filter 22 to UV system 30 is tested at total suspended solids meter 66.

A dirty stream from filter 22 goes overboard at line 68 by opening valve 70 and this is controlled by the filter. This is controlled by the normal ship backwash control circuit.

Discharge of ballast water in the port is retreated thru the UV system 30, valve 72 and outlet line 74.

Influent Monitoring:

Monitoring is done for: TSS or Total Suspended Solids at meter 66; for Turbidity at a meter cluster 76 which also measures pH, temperature and salinity; and UV Transmission Rate of water coming through strainer 54. The UV (e.g. Berson) light bulb intensity level is measured at light meter 78 and the light transmission rate thru the water is measured; as is conductivity (salinity), temperature and pH at meter cluster 76, along with flow rate and system water pressure at meter 80 and 82.

Effluent Monitoring:

Monitor for UV Transmission Rate, measure Berson light bulb intensity level, light transmission rate thru the water and flow rate.

Filter Reporting Information Available:

Alarm Conditions: Continuous Flush; Filters Removal Rate can be derived based on Influent TSS minus the Effluent TSS.

Event: Frequency of the Filter Backwashes; Percent of Flush Water—by General Flow Rate minus the Flush water equals the Percent of Flush Water.

UV Reporting Information Available:

Alarm Conditions; Wiper Alarm; Lamp out Alarm; Temperature Alarm Cabinet; Temperature Alarm Cylinder; Ground Failure Electrical Fault; Power Cabinet; Temperature Warning; Power Cabinet Temperature Trip; Wiper Timeout; Wiper Current Error; Water Detection Trip; Water Temperature Warning; Water Temperature Trip; Low Dose; Low Intensity; Dose Failure; Intensity Failure; Flow to High; Temperature Current Trip; Ultraviolet system Current; Flow Current; Current Low; Sensor Current Low; Lamp Fault; Too Many Lamps Failing; Lost Communication V10 Trip; Running Time meter and Dose Readout.

Ballast Water Reporting Requirements:

Ballast—Influent: Record when the Ballast Water is brought on to the ship, circulated, treated and put in ballast tank.

Deballast—Effluent

Record when the Ballast Water is discharged to sea.

Ballast Water Recording:

When the system starts up initially take data every minute continuously after startup.

Ballast Water Report Formats:

Local Report—Shipping Companies—Local Report Format

Government Reports—Government Report Format Comb Test Reports—University Report Format.

Ballast Water Sampling Requirements:

Ballast Water Exchange Standard—Regulation D-1 just for background information only.

Ballast Water Performance Standard—Regulation D-2 is what the BWTS will accomplish at a minimum.

Control Sequence:

Automatic:

The Automatic Ballast Water Treatment System (BWTS) will operate in the following manner. Start BWTS. The ship operator will push the BWTS Start button on the ABB Remote Control Panel located in the Ship Engineering Control Room. After the button is pushed UV Warm-up about 2 minutes after warm-up the Ships BW pump starts upon signal from the UV system and now the Water Quality Monitoring starts. BW flows thru BWTS Filter and UV System based on control of Differential Pressure and UV Dosage. The UV Dosage signal is transmitted to the ABB PLC and the ABB PLC controls the Flowrate of BWTS. Flow is paced based on the UV Dosage. If UV transmittance changes so does the Dosage. IF UV Dosage transmittance gets to Low then to the ABB PLC decrease the flow. The Diff Pressure signal is transmitted at the same time to ABB PLC to determine whether to change the flushing interval or reduce the flowrate. As the BWTS treats the BW on the Ship it then is treated and stored in the Ballast Tanks.

Stop BWTS:

The ship operator will push the BWTS Stop button on the ABB Remote Control Panel located in the Ship Engineering Control Room.

After the button is pushed to stop the system the Filter backwash starts for 2 flushing intervals and then the UV system switches off, the BW pump stops then the BWTS Filter Fresh Water Flush timer will start immediately for 10 minutes and the system shuts off.

The present invention may also include, among its monitors and sensors as illustrated in FIG. 2, in suspended solids meter 66 for example, a Marine Organism Monitoring Device (MOM). This may be a device such as the Fluid Imaging Technology device that is sold by Fluid Imaging Technologies of Yarmouth, Me., for example, which is capable of monitoring the presence of selected marine organisms, counting the number of such organisms and when determining the number of such organisms to be present in sufficient populations in the source water, to provide a signal to controls of the system allowing for a change in flow rate and, as a result, the degree of treatment.

The invention can also include an Alternative Secondary Treatment (AST). While a primary focus is on the utilization of high dose UV treatment for post filter secondary treatment, the invention may include the use of alternative secondary treatments that may now or in the future be appropriate for use in different (higher or lower) flow rate systems. Examples of possible alternative secondary treatments might be the use of so called Oxidizing Agents such as those available from Evonik Industries under the trademark PERALCLEAN or electrochlorination products sold by US Filter Corporation.

A Mud and Silter Remover (MSR) may also be provided to inject downstream of the system a polymer based liquid that keeps the fine silt and sediments (those particles too small to be removed by the first stage filter) in suspension, allowing it to be discharged when deballasting.

While specific embodiments of the invention have been shown and described in detail to illustrate the application of the principles of the invention, it will be understood that the invention may be embodied otherwise without departing from such principles.

What is claimed is:

1. A ballast water treatment system for treating water for a vessel having a ballast tank and a ballast pump, comprising:
    pathway means defining a water pathway having a main inlet for connection to a body of navigable raw water for the vessel, the raw water containing sediment and marine organisms, the pathway also having a main outlet for connection to the ballast tank and a discharge for discharging water to the body of navigable raw water, the pathway including ballast water piping for supplying raw water from the main inlet to the main outlet for the ballast tank;
    a back washable filter in the pathway, the filter having a filter inlet for receiving the raw water from the main inlet, the filter screening sediment from the raw water to produce initially processed water which contains at least some marine organisms, the filter having a first outlet for supplying initially processed water to the pathway, a second outlet for supplying back washing water to the discharge, and a third outlet connected to said second outlet for supplying pre-screened water from the filter to the discharge and wherein said pre-screened water from said third outlet and back washing water from said second outlet do not enter the ballast tank;
    biocidal means connected between the first outlet of the filter and the main outlet to the ballast tank, for receiving initially processed water from the filter and for disabling or killing the marine organisms in the initially processed water to produce treated ballast water for the main outlet to the ballast tank;
    the pathway being adapted for connection to the ballast pump of the vessel, so that the ballast pump is in line with the filter and biocidal means and in line with the ballast water piping for pumping water along the pathway between the main inlet and the main outlet, and through the filter and the biocidal means; and
    a sensor along the pathway for at least sensing the rate of light transmission through the water and control means connected to the sensor for regulating the flow rate of raw water for the vessel in response to the sensing by said sensor.

2. The ballast water treatment system according to claim 1, including a fresh water flush inlet connected to the filter for supplying clean water to the filter and a back flush pump for pumping clean water from the fresh water flush inlet through the filter to back flush the filter.

3. The ballast water treatment system according to claim 1, including a filter bypass pipe for bypassing the filter, the ballast tank having a tank outlet for water from the tank, the tank outlet being connected to an inlet of the ballast pump, a valve set connected to the bypass pipe and the biocidal means for passing water from the ballast tank, through the tank outlet and the bypass pipe and from the biocidal means to the discharge for disabling or killing marine organisms in the water from the ballast tank before the water is returned to the body of water, and a fresh water flush inlet connected to the filter for supplying fresh raw water from the body of water to the filter and a back flush pump for pumping fresh raw water from the fresh water flush inlet through the filter to back flush the filter.

4. The ballast water treatment system according to claim 1, including a filter bypass pipe for bypassing the filter, the ballast tank having a tank outlet for water from the tank, the tank outlet being connected to an inlet of the ballast pump, and a valve set connected to the bypass pipe and the biocidal means for passing water from the ballast tank, through the tank outlet and the bypass pipe and from the biocidal means to the discharge for disabling or killing marine organisms in the water from the ballast tank before the water is returned to the body of water.

5. The ballast water treatment system according to claim 1, including a light sensor connected to the biocidal means for sensing a clarity of water in the biocidal means, the light sensing being connected to control means for regulating the operation of the biocidal means.

6. The ballast water treatment system according to claim 1, including a light sensor connected to the biocidal means for sensing a clarity of water in the biocidal means, the light sensing being connected to the control means for regulating the operation of the biocidal means, the system including a filter bypass pipe for bypassing the filter, the ballast tank having a tank outlet for water from the tank, the tank outlet being connected to an inlet of the ballast pump, and a valve set connected to the bypass pipe and the biocidal means for passing water from the ballast tank, through the tank outlet and the bypass pipe and from the biocidal means to the discharge for disabling or killing marine organisms in the water from the ballast tank before the water is returned to the body of water.

7. The ballast water treatment system according to claim 1, wherein the filter comprises a self-cleaning screening stage and a self-cleaning filter stage.

8. A ballast water treatment system for treating water for a vessel having a ballast tank and a ballast pump, comprising:

pathway means defining a water pathway having a main inlet for connection to a body of navigable raw water for the vessel, the raw water containing sediment and marine organisms, the pathway also having a main outlet for connection to the ballast tank and a discharge for discharging water to the body of navigable raw water, the pathway including ballast water piping for supplying raw water from the main inlet to the main outlet for the ballast tank;

a back washable filter in the pathway, the filter having a filter inlet for receiving the raw water from the main inlet, the filter screening sediment from the raw water to produce initially processed water which contains at least some marine organisms, the filter having a first outlet for supplying initially processed water to the pathway, a second outlet for supplying back washing water to the discharge, and a third outlet connected to said second outlet for supplying pre-screened water from the filter to the discharge and wherein said pre-screened water from said third outlet and back washing water from said second outlet do not enter the ballast tank;

biocidal means connected between to the first outlet of the filter and the main outlet to the ballast tank, for receiving initially processed water from the filter and for disabling or killing the marine organisms in the initially processed water to produce treated ballast water for the main outlet to the ballast tank;

the pathway being adapted for connection to the ballast pump of the vessel, so that the ballast pump is in line with the filter and biocidal means and in line with the ballast water piping for pumping water along the pathway between the main inlet and the main outlet, and through the filter and the biocidal means;

a fresh water flush inlet connected to the filter for supplying fresh raw water from the body of water to the filter and a back flush pump for pumping fresh raw water from the fresh water flush inlet through the filter to back flush the filter; and a sensor along the pathway for at least sensing the rate of light transmission through the water and control means connected to the sensor for regulating the flow rate of raw water for the vessel in response to the sensing by said sensor.

9. The ballast water treatment system according to claim 8, a light sensor connected to the biocidal means for sensing a clarity of water in the biocidal means, the light sensing being connected to the control means for regulating the operation of the biocidal means, the system including a filter bypass pipe for bypassing the filter, the ballast tank having a tank outlet for water from the tank, the tank outlet being connected to an inlet of the ballast pump, and a valve set connected to the bypass pipe and the biocidal means for passing water from the ballast tank, through the tank outlet and the bypass pipe and from the biocidal means to the discharge for disabling or killing marine organisms in the water from the ballast tank before the water is returned to the body of water.

10. The ballast water treatment system according to claim 8, including a filter bypass pipe for bypassing the filter, the ballast tank having a tank outlet for water from the tank, the tank outlet being connected to an inlet of the ballast pump, a valve set connected to the bypass pipe and the biocidal means for passing water from the ballast tank, through the tank outlet and the bypass pipe and from the biocidal means to the discharge for disabling or killing marine organisms in the water from the ballast tank before the water is returned to the body of water, and a fresh water flush inlet connected to the filter for supplying fresh raw water from the body of water to the filter and a back flush pump for pumping fresh raw water from the fresh water flush inlet through the filter to back flush the filter.

11. The ballast water treatment system according to claim 8, including a filter bypass pipe for bypassing the filter, the ballast tank having a tank outlet for water from the tank, the tank outlet being connected to an inlet of the ballast pump, and a valve set connected to the bypass pipe and the biocidal means for passing water from the ballast tank, through the tank outlet and the bypass pipe and from the biocidal means to the discharge for disabling or killing marine organisms in the water from the ballast tank before the water is returned to the body of water.

12. The ballast water treatment system according to claim 8, wherein the filter comprises a self-cleaning screening stage and a self-cleaning filter stage.

13. A ballast water treatment system for treating water for a vessel having a ballast tank and a ballast pump, comprising:

pathway means defining a water pathway having a main inlet for connection to a body of navigable raw water for the vessel, the raw water containing sediment and marine organisms, the pathway also having a main outlet for connection to the ballast tank and a discharge for discharging water to the body of navigable raw water, the pathway including ballast water piping for supplying raw water from the main inlet to the main outlet for the ballast tank;

a back washable filter in the pathway, the filter having a filter inlet for receiving the raw water from the main inlet, the filter screening sediment from the raw water to produce initially processed water which contains at least some marine organisms, the filter having a first outlet for supplying initially processed water to the pathway, a second outlet for supplying back washing water to the discharge, and a third outlet connected to said second outlet for supplying pre-screened water from the filter to the discharge and wherein said pre-screened water from said third outlet and back washing water from said second outlet do not enter the ballast tank;

biocidal means connected between the first outlet of the filter and the main outlet to the ballast tank, for receiving initially processed water from the filter and for disabling or killing the marine organisms in the initially processed water to produce treated ballast water for the main outlet to the ballast tank;

the pathway being adapted for connection to the ballast pump of the vessel, so that the ballast pump is in line with the filter and biocidal means and in line with the ballast water piping for pumping water along the pathway between the main inlet and the main outlet, and through the filter and the biocidal means;

a filter bypass pipe for bypassing the filter, the ballast tank having a tank outlet for water from the tank, the tank outlet being connected to an inlet of the ballast pump, and a valve set connected to the bypass pipe and the biocidal means for passing water from the ballast tank, through the tank outlet and the bypass pipe and from the biocidal means to the discharge for disabling or killing marine organisms in the water from the ballast tank before the water is returned to the body of water; and a sensor along the pathway for at least sensing the rate of light transmission through the water and control means connected to the sensor for regulating the flow rate of raw water for the vessel in response to the sensing by said sensor.

14. The ballast water treatment system according to claim 13, including a fresh water flush inlet connected to the filter for supplying fresh raw water from the body of water to the filter and a back flush pump for pumping fresh raw water from the fresh water flush inlet through the filter to back flush the filter.

15. The ballast water treatment system according to claim 13, including a light sensor connected to the biocidal means for sensing a clarity of water in the biocidal means, the light sensing being connected to control means for regulating the operation of the biocidal means.

16. The ballast water treatment system according to claim 13, wherein the filter comprises a self-cleaning screening stage and a self-cleaning filter stage.

17. The ballast water treatment system according to claim 13, including a marine organism monitoring device for monitoring a marine organism content in water from the back washable filter.

* * * * *